(12) United States Patent
Raksi

(10) Patent No.: US 8,724,666 B1
(45) Date of Patent: May 13, 2014

(54) SELF STARTING MODE-LOCKED LASER OSCILLATOR

(71) Applicant: Alcon LenSx, Inc., Fort Worth, TX (US)

(72) Inventor: Ferenc Raksi, Mission Viejo, CA (US)

(73) Assignee: Alcon LenSx, Inc., Aliso Viejo, CA (US)

( * ) Notice: Subject to any disclaimer, the term of this patent is extended or adjusted under 35 U.S.C. 154(b) by 0 days.

(21) Appl. No.: 13/733,966

(22) Filed: Jan. 4, 2013

(51) Int. Cl.
*H01S 3/113* (2006.01)
*H01S 3/11* (2006.01)
*H01S 3/00* (2006.01)
*H01S 3/034* (2006.01)
*H01S 3/08* (2006.01)
*H01S 3/081* (2006.01)
*H01S 3/086* (2006.01)
*H01S 3/102* (2006.01)

(52) U.S. Cl.
CPC ............... *H01S 3/1115* (2013.01); *H01S 3/005* (2013.01); *H01S 3/034* (2013.01); *H01S 3/08095* (2013.01); *H01S 3/081* (2013.01); *H01S 3/0816* (2013.01); *H01S 3/086* (2013.01); *H01S 3/1024* (2013.01); *H01S 3/11* (2013.01); *H01S 3/1106* (2013.01); *H01S 3/1118* (2013.01); *H01S 3/1109* (2013.01); *H01S 3/1112* (2013.01)
USPC .................. 372/11; 372/18; 372/26; 372/30; 372/92; 372/108

(58) Field of Classification Search
CPC ..... H01S 3/005; H01S 3/034; H01S 3/08095; H01S 3/081; H01S 3/0816; H01S 3/086; H01S 3/1024; H01S 3/11; H01S 3/1106; H01S 3/1118; H01S 3/1109; H01S 3/1112; H01S 3/1115

USPC .................... 372/11, 18, 26, 30, 92
See application file for complete search history.

(56) References Cited

U.S. PATENT DOCUMENTS

2007/0047596 A1* 3/2007 Liu .................................. 372/6
2012/0305811 A1* 12/2012 Wakabayashi et al. ... 250/504 R
2013/0244449 A1* 9/2013 Baird et al. .................. 438/795

OTHER PUBLICATIONS

Haus Hermann A., "Parameter Ranges for CW Passive Mode Locking", IEEE Journal of Quantum Electronics, Mar. 1976, pp. 169-176, vol. QE-12, No. 3.

Hönninger C., et al., "Q-switching stability limits of continuous-wave passive mode locking", J. Opt. Soc. Am. B, Jan. 1999, pp. 46-56, vol. 16, No. 1.

Keller Ursula, et al., "Ultrafast Solid-State Mode-Locked Lasers Using Resonant Nonlinearities", IEEE Journal of Quantum Electronics, Oct. 1992, pp. 2123-2133, vol. 28, No. 10.

(Continued)

*Primary Examiner* — Dung Nguyen

(57) ABSTRACT

A laser oscillator to generate a pulsed light beam includes an output coupler mirror, configured to reflect a reflected portion of the pulsed light beam back into the laser oscillator, and to couple an outputted portion of the pulsed light beam out from the laser oscillator; an end-mirror, configured to return the pulsed light beam into the laser oscillator; a gain material, positioned between the output coupler mirror and the end-mirror along an optical path, configured to amplify the pulsed light beam; a self-starting saturable absorber, configured to self-start a pulsed mode-locking operation of the laser oscillator; and a pulse-shaping saturable absorber, configured to shape pulses of the pulsed light beam into laser pulses with a pulse length of less than 1,000 femtoseconds.

16 Claims, 9 Drawing Sheets

(56) References Cited

OTHER PUBLICATIONS

Keller Ursula, "Recent developments in compact ultrafast lasers", Nature, Aug. 14, 2003, pp. 831-838, vol. 424.

Keller Ursula, et al., "Semiconductor Saturable Absorber Mirrors (SESAM's) for Femtosecond to Nanosecond Pulse Generation in Solid-State Lasers", IEEE Leos Newsletter, Aug. 2007, pp. 8-26.

SAM information, "How does a SAMTM work?", printed from http://www.batop.com/information/SAM_infos.html on Dec. 7, 2012 from, 5 pages.

Spühler G.J., et al., "Semiconductor saturable absorber mirror structures with low saturation fluence", Appl. Phys. B, 2005, pp. 27-32, vol. 81.

* cited by examiner

SELF STARTING MODE-LOCKED LASER OSCILLATOR

TECHNICAL FIELD

This patent document relates to laser oscillators, in more detail to mode-locked laser oscillators with a self-starting capability.

BACKGROUND

In mode-locked laser oscillators, the cavity modes get populated during the roundtrips of the light pulses in the oscillator. These oscillators include a mode-locking component that synchronizes the phases of the different cavity modes, organizing them into a series of ultra-short laser pulses.

Several mechanisms can lead to mode-locking, including a temporal or spectral modulation of the amplifying gain, cavity loss, or mode structure of the laser cavity. Broad classes of these mechanisms can be characterized as non-linear optical behavior or response. In actively mode-locked lasers the mode-locking processes are controlled by external active intervention. In passively mode-locked lasers the dynamics of the laser itself modulates the parameters of the cavity. Both classes of lasers can exhibit a rich dynamic behavior that eventually determines the operating parameters and output characteristics of the generated pulses, including the pulse duration, average power, peak power, mode-quality, dynamic stability, and self-starting capability.

The output characteristics of mode-locked laser oscillators usually reflect design compromises between contradicting requirements, as the mode-locking nonlinear behavior is controlling more than one output characteristics of the laser oscillator. An example of such contradicting requirements is the need for the nonlinear optical behavior to be active long enough to self-start the laser oscillator, competing with the need for the nonlinear optical behavior to be active only for a short time to create ultra-short laser pulses.

Some laser designs resolve these contradicting or competing requirements by including two mode-locking components with different nonlinear mechanisms to synchronize the phases. For example, one of the end mirrors or the gain material of the oscillator can exhibit a nonlinear mechanism that effects the phases of the cavity modes, and an additional absorber element can mode-lock the cavity modes by modulating their amplitudes. The above competing design requirements can be resolved by implementing nonlinear elements that have different characteristic time scales.

Another pair of contradictory design requirements involves the beam intensity for the onset of the nonlinear optical behavior. The self-starting functionality prefers low onset beam intensities, whereas an efficient way to shape the pulses into ultra-short pulses involves high onset beam intensities. Again, some lasers include different components relying on different nonlinear mechanisms to simultaneously satisfy these design requirements.

Using two nonlinear elements to resolve the design conflicts in these lasers, however, also introduces problems. Each nonlinear element can be complex and expensive. Moreover, often the benefits come at a cost. For example, the phase-modulating Kerr-effect some designs rely on introduces an unintended and undesirable complex coupling between temporal and spatial effects, modulating the pulse as it propagates through the Kerr-cell-based nonlinear element. This modulation needs to be taken into account when designing the cavity, inconveniently increasing the complexity of the design. Further, the cavity needs to be stable without taking into account the Kerr-effect for the self-starting, and with the Kerr-effect for generating short mode-locked pulses. Fulfilling these requirements is not always possible. The operating range of such designs can be very narrow in terms of tolerances of the cavity parameters. Also, the resulting laser may not be stable against environmental perturbations. Other nonlinear elements can come with comparable challenges as well.

SUMMARY

This patent document outlines embodiments of a laser oscillator to generate a pulsed light beam, wherein the laser oscillator includes an output coupler mirror, configured to reflect a reflected portion of the pulsed light beam back into the laser oscillator, and to couple an outputted portion of the pulsed light beam out from the laser oscillator; an end-mirror, configured to return the pulsed light beam into the laser oscillator; a gain material, positioned between the output coupler mirror and the end-mirror along an optical path, configured to amplify the pulsed light beam; a self-starting saturable absorber, configured to self-start a pulsed mode-locking operation of the laser oscillator; and a pulse-shaping saturable absorber, configured to shape pulses of the pulsed light beam into laser pulses with a pulse length of less than 1,000 femtoseconds (fs).

Some embodiments of the laser oscillator include an output coupler mirror, configured to reflect a portion of the pulsed light beam back into the laser oscillator, and to couple a portion of the pulsed light beam out from the laser oscillator; a semiconductor saturable absorption mirror structure, comprising an end-mirror layer, configured to return the pulsed light beam into the laser oscillator, a self-starting saturable absorption layer, configured to self-start a pulsed mode-locking operation of the laser oscillator, and a pulse-shaping saturable absorption layer, configured to shape pulses of the pulsed light beam into laser pulses with a pulse length of less than 1,000 femtoseconds; and a gain material, positioned between the output coupler mirror and the semiconductor saturable absorption mirror along an optical path, configured to amplify the pulsed light beam.

DETAILED DESCRIPTION

Figure 1:
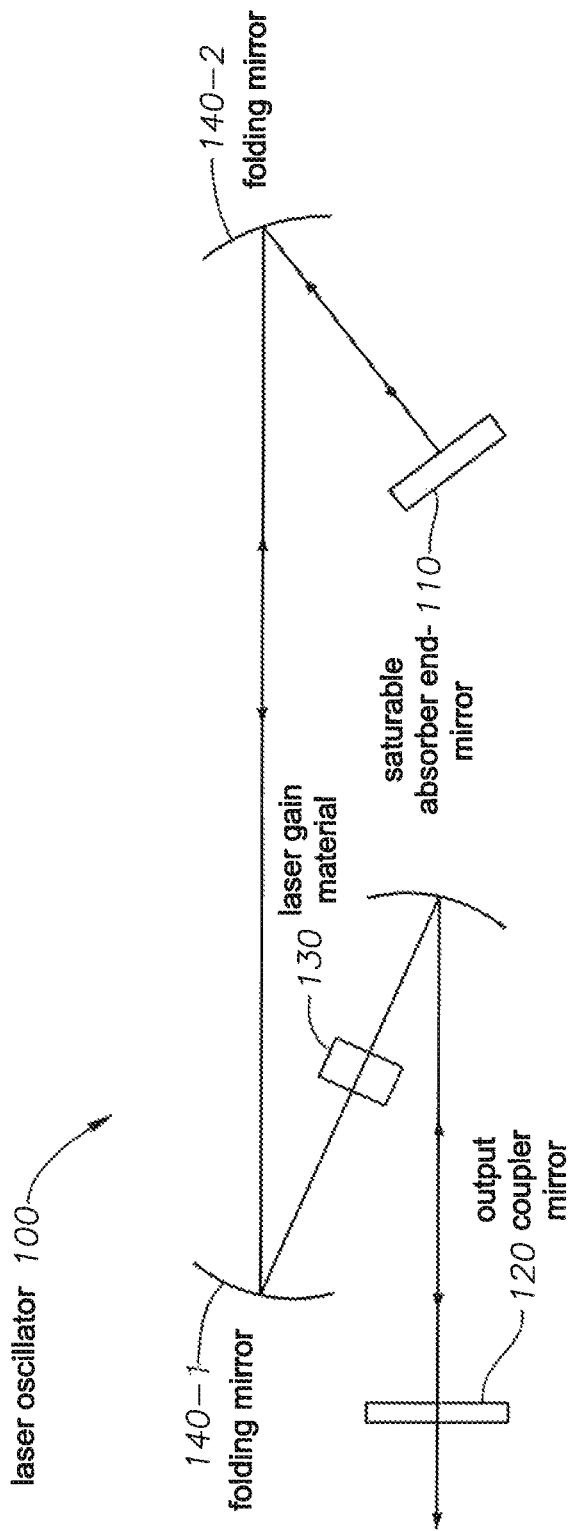
FIG. 1 illustrate a laser oscillator 100 with a saturable absorber 110.

FIG. 1 illustrates a typical passively mode-locked laser oscillator 100 in some detail. The oscillator 100 can include a nonlinear element 110, such as a saturable absorber 110 that serves as an end mirror or reflector of the laser cavity of the oscillator 100. The oscillator 100 can also include an output coupler mirror 120, a laser gain material 130, and, for compact designs, one or more folding mirrors 140-1, 140-2, etc. The laser gain material 130 can be pumped by various systems, such as by one or more pumping diodes. The pumping excites electrons in the gain material 130 to higher energy levels, whose subsequent induced transitions back to their low energy states emits photons, populating the cavity modes of the oscillator 100. The terminology is often used that the end mirror 110 and the output coupler mirror 120 define a laser cavity.

The most advanced saturable absorbers 110 are semiconductor saturable absorber mirrors, or SESAMSs, with quantum well structures as absorbers. While here the operating principles will be described for the nonlinear element 110 being a saturable absorber, other embodiments can use other nonlinear elements, such as saturable gain elements. In these nonlinear elements the light propagating through the amplifying or absorbing material changes the population density of the atomic levels, molecular levels or semiconductor band structure and thus changes the gain, absorption or reflection characteristics of the material.

The nonlinear saturable absorber element 110, such as a SESAM 110, can absorb a fraction of incident low intensity light but becomes saturated when the light intensity reaches a threshold level called the saturation fluence $F_{sat,a}$, losing its ability to absorb light whose intensity exceeds the threshold. Sometimes this saturation is also referred to as the activation of the saturable absorber 110. The saturation fluence depends on the atomic, molecular and spectroscopic properties of the absorber material and is given by the formula $F_{sat,a}=h\nu/\sigma_a$, where $h\nu$ is the photon energy and $\sigma_a$ is the absorption cross section of the absorbing centers in the material. Typical values for $F_{sat,a}$ are from $10\,\mu J/cm^2$ to $500\,\mu J/cm^2$. The saturation energy of the absorber, $E_{sat,a}$ is a product of the saturation fluence $F_{sat,a}$ and the effective mode area $A_{eff,a}$ at the location of the absorber: $E_{sat,a}=A_{eff,a}\cdot F_{sat,a}$. Analogous relations describe saturable gain materials, connecting the saturation fluence $F_{sat,g}$ and saturation energy $E_{sat,g}$ of the gain material: $E_{sat,g}=A_{eff,g}\cdot F_{sat,g}$, where $F_{sat,g}=h\nu/\sigma_g$, with $\sigma_g$ being the gain cross section of the gain centers in the material and $A_{eff,g}$ the effective mode area at the location of the gain material. In some cases the unsaturated absorber 110 can absorb an absorption fraction, such as 1-10% of the incident tight when the light's intensity is below the saturation threshold. On the other hand, once the beam intensity exceeds the saturation threshold, the absorber 110 gets saturated and its absorptivity can fall well below 1%.

Once the oscillator 100 and its pumping diode is energized, the cavity modes get populated and light starts to make roundtrips between the saturable absorber end mirror 110 and the output coupler mirror 120. During every roundtrip, the gain material 130 amplifies the light by an amplification fraction. At low pumping powers, and accordingly low beam fluences, the amplification or gain fraction of the gain material 130 is lower than the absorption fraction of the saturable absorber 110, thus preventing the start of the lasing action of the oscillator 100. As the pumping and thus the gain is increased, the amplification fraction can exceed the absorption fraction and the lasing action of the oscillator 100 can turn on. As long as the beam fluence remains well below $F_{sat}$, the absorber has no dynamic or nonlinear action and the lasing will occur in a continuous wave mode.

As the pumping and thus the gain is further increased, the beam fluence can rise towards $F_{sat,a}$. At these fluences the nonlinearity of the saturable absorber 110 gets activated and gives rise to a dynamic action: when the phases of the cavity modes of the oscillator 100 happen to be constructively synchronized via random fluctuations, and thus give rise to a phase-synchronized pulse with an enhanced-amplitude whose fluence rises above the saturation fluence threshold $F_{sat,a}$, the absorption fraction of the saturable absorber 110 diminishes and thus roundtrip-by-roundtrip this phase-synchronized pulse gets amplified stronger than the rest of the beam by the gain material 130. This selective amplification of a phase-synchronized pulse, often referred to as mode-locking, starts up the pulsed operation of the laser oscillator 100 instead of the continuous wave mode.

The output coupler mirror 120 can be designed to transmit a few percent fraction of the incident laser pulse during reflection, releasing a laser pulse from the oscillator 100. The reflected fraction of the laser pulse undergoes its next roundtrip and returns to the output coupler mirror 120 re-amplified where the output coupler mirror 120 transmits a fraction of the laser pulse again. As this process is repeated during each round trip, the laser oscillator 100 outputs a laser pulse train. This process is often referred to as the self-starting of the mode-locked operations of the laser oscillator 100.

Materials within the cavity such as the glass or crystal of the gain material possess chromatic dispersion resulting in different spectral components of the pulse propagating at different speeds within the material. This dispersion undesirably broadens or spreads the pulse and increases the mode-locking threshold. It is therefore common to control the dispersion of light in the laser cavity by including compensating elements in the cavity, such as dispersive prism pairs or chirped mirrors. It is noted that even the self-starting mechanism can be aided by such compensating elements.

A useful measure to quantify the dispersion is the "group delay dispersion", or GDD, often defined as:

$$GDD=\lambda^3/c^2 * d^2 n(\lambda)/d\lambda^2 * L,$$

where $\lambda$ is the wavelength of the light, c is the speed of light, $n(\lambda)$ is the wavelength dependent index of refraction and L is the length of the optical pathway in the cavity. The GDD of the optical elements 110-140, and of any other optical element which may be present in the oscillator 100 can be determined e.g. by measurement or inferred from the design. Armed with the knowledge of the GDD, a dispersion controller can be implemented in the cavity with a GDD of approximately equal and opposite value to the determined GDD of the optical elements of the oscillator 100. The so-designed cavity produces little or no dispersion during the roundtrips of the pulses, eliminating the described problems and enhancing the utility of the laser oscillator.

Dispersion compensation can also counteract additional spreading of the pulse initiated by time varying phase changes of the light, caused by non-linear effects. When a cavity is efficiently compensated, minimizing the temporal spreading of the pulses due to dispersion and non-linear effects, the laser pulse in the cavity is referred to as a soliton and the laser is said to operate in the soliton mode-locking regime.

Figure 2:
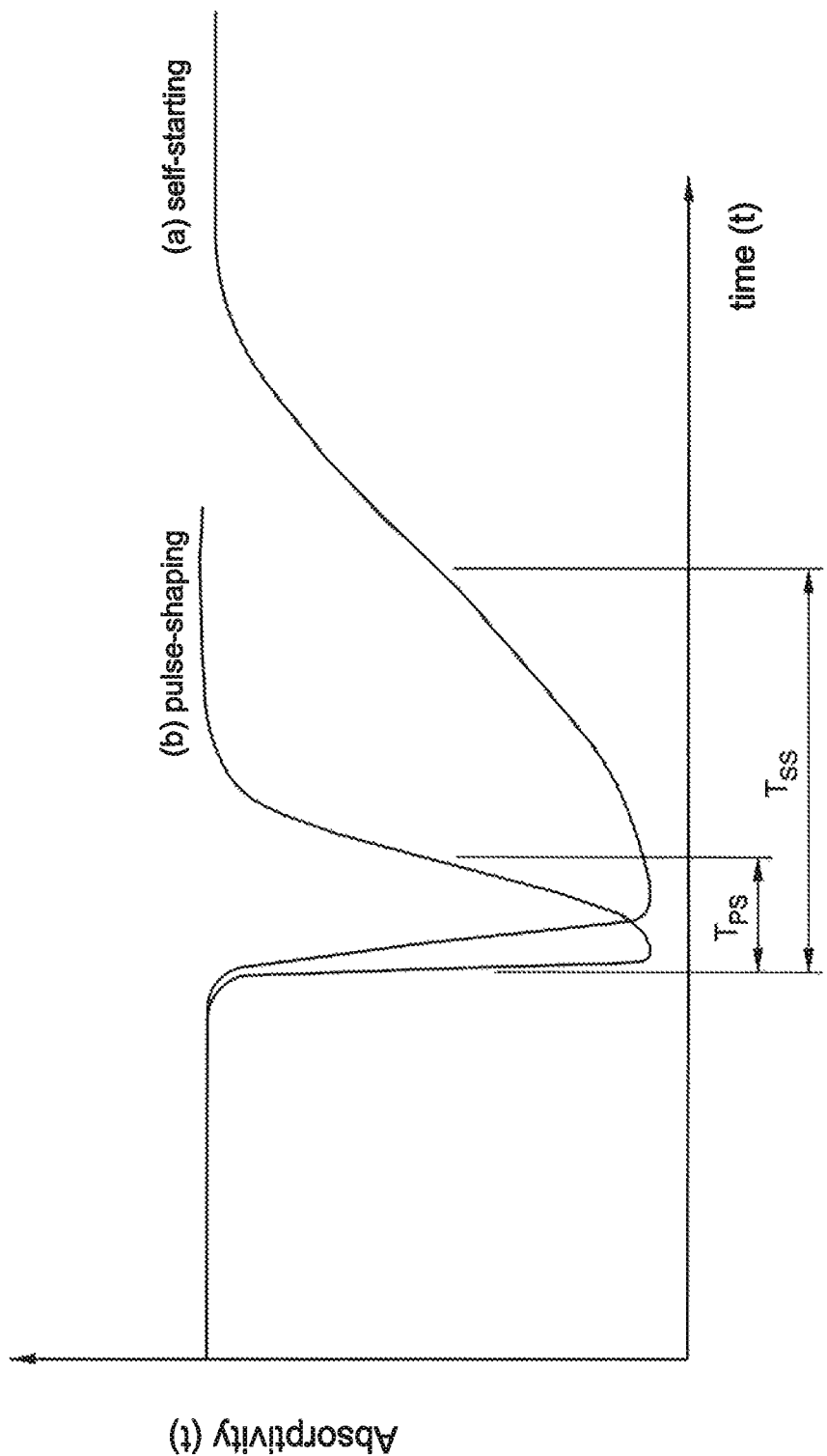
FIG. 2 illustrates the time dependence of the absorptivity of various laser oscillators.

FIG. 2 illustrates that the activated state of the saturable absorber 110 is transient: once activated, or open, the absorptivity of the saturable absorber 110 dips to its near-transparent values only for a short time, followed by a recovery of its ability to absorb light over a saturable absorber recovery time.

The design of these passively mode-locked laser oscillators 100 faces two design requirements: the oscillators 100 are expected to be able to self-start the mode-locking operation and to shape the outputted pulses into ultra-short, high intensity laser pulses. These requirements are contradictory and competing. On one hand, the oscillator will be able to self-start if the saturable absorber 110 stays open for a long enough self-starting time $T_{SS}$ to amplify into a strong pulse a small fluctuation created by the accidental alignment of several non-synchronized cavity modes with different periods. The saturable absorber recovery time necessary for self-starting, $T_{SS}$, depends on several material characteristics and can vary in a wide range. Curve (a) shows that typical values of $T_{SS}$ can include tens of femtoseconds (fs) to tens or hundreds of nanosceconds, such as in the range of 10 fs-100 ns, in some other cases 100 fs-10 ns, in yet other cases 500 fs-10 ns.

On the other hand, the longer the saturable absorber recovery time of the saturable absorber 110, the longer the amplified pulse. Therefore, the second design requirement, the need to shape the pulses into ultra-short pulses, such as into pulses in the tens of femtoseconds range, calls for the same saturable absorber recovery time to be a sufficiently short pulse shaping time $T_{PS}$ to shape the pulses into ultra-short pulses. Curve (b) shows that typical values of the pulse shaping time $T_{PS}$ can lie in the range of 1 fs-1 ns, in some other cases 10 fs-1 ns, in yet other cases 50 fs-500 fs.

Furthermore, the laser cavity also needs to achieve the desired dynamic behavior on the longer time scale of the buildup of the pulses in the cavity during many round trips. When the laser is stable on this time scale, the laser emits a "continuous wave" train of mode-locked pulses in the so called cw mode-locked regime. If the dynamics is unstable on this build-up scale, the result is a periodic sequence of giant q-switched pulses with short mode-locked pulses under the q-switched intensity envelope, or pulses under a more random envelope. Operation of the laser in such a q-switched mode-locked (QML) regime can potentially damage the optical components of the laser. Therefore, operation in the cw mode-locked regime is often desirable, for example when the laser pulses are injected into a subsequent amplifier.

There are again contradicting requirements for the design of the saturable absorber: this time on the threshold amplitudes where the non-linearity gets activated, opening up the absorber. To generate mode-locked, ultra-short pulses, the saturable absorber 110 should open at higher intensities. Such designs select for further amplification only the close vicinity of the peak of the accidentally formed pulse, making the pulse ultra-short. For completeness, the gain saturation and Kerr lensing is often tuned together with the absorption to achieve ultra-short, higher intensity pulses.

Unfortunately, the same high threshold amplitudes are more likely to give rise to the undesirable q-switching. These competing requirements, however, still leave a limited range of parameters where cw mode-locking can be achieved without q-switching. Without adjusting the Kerr lensing, stability against QML can be achieved by tuning the absorption and gain saturation to satisfy:

$$E_P \left| \frac{d q_P(E_P)}{dE_P} \right|_{E_{St}} < \frac{T_R}{\tau_L} + \frac{E_P}{E_{sat,g}},$$

where $q_P(E_p)$ represents the round-trip loss in pulse energy introduced by the saturable absorber for a given mode-locked pulse with intra-cavity pulse energy $E_P$ in the cavity; $E_{st}$ is the steady state value of the pulse energy; $T_R$ is the round-trip time of the cavity; and $\tau_L$ is the lifetime of the upper state of the gain medium. This equation shows that for small intra-cavity power the reduction of the loss due to saturation should be larger than the reduction of the gain, in order to turn on mode-locking and keep the pulse energy growing exponentially. However, the reduction of loss should be limited above a certain intra-cavity energy as prescribed by the limited, magnitude of the derivative of the loss in the equation above. From that point the gain would diminish faster than the losses diminish and the laser pulse stops growing further, avoiding oscillations and q-switching. In the equation $q_P(E_p)$ represents all saturable losses. E.g. in case of two absorbers in the cavity, $q_p(E_p)$ is the sum of the contributions from the individual absorbers: $q_p = q_{p1} + q_{p2}$.

In sum, pulse-shaping and self-starting impose contradictory requirements on the recovery time and pulse-shaping and QML stability impose contradictory requirements on the saturation fluence. The need to satisfy these contradictory requirements poses a substantial challenge on the design of passively mode-locked laser oscillators that use a single non-linear element, such as the saturable absorber 110.

Figure 3A:
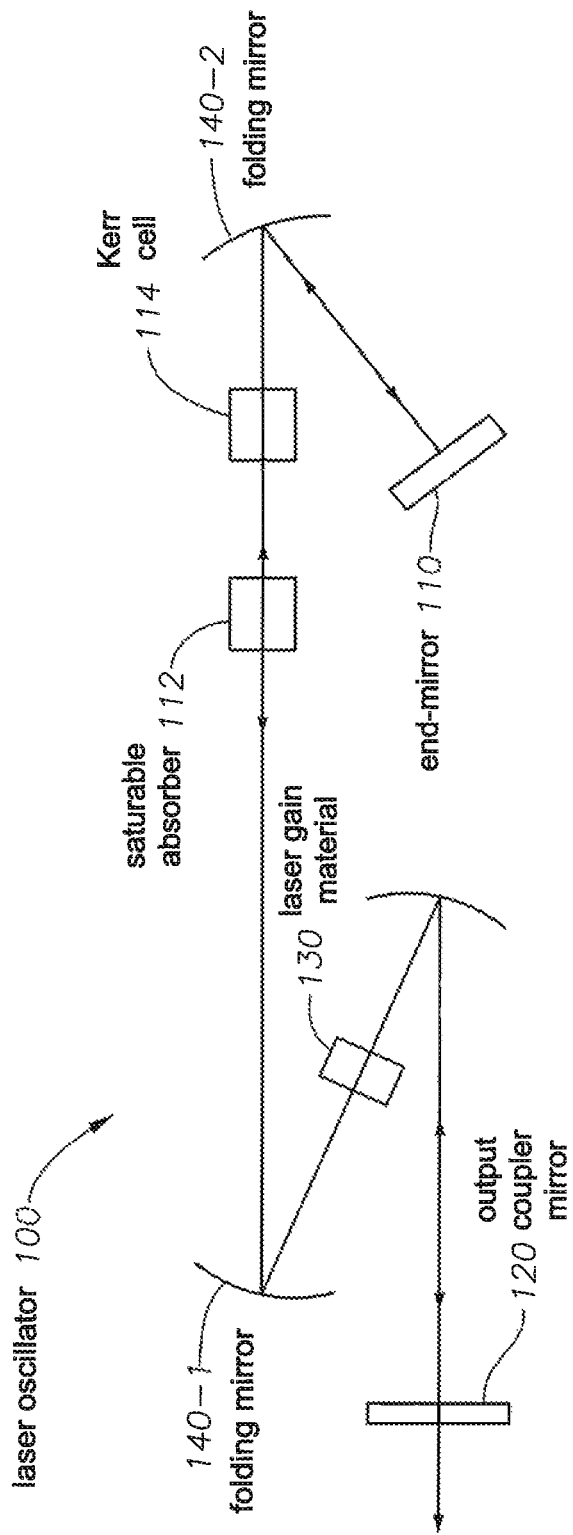
FIG. 3A illustrates a laser oscillator 100 with a saturable absorber 112 and a Kerr cell 114.

FIG. 3A illustrates that, as mentioned before, some laser oscillators 100 can make use of two nonlinear elements, a slow nonlinear element 112 and a fast nonlinear element 114, to satisfy these conflicting design requirements. For example, the slow nonlinear element can be a saturable absorber 112 and the fast nonlinear element can be a Kerr cell 114. The Kerr cell can be a separate element in the cavity or the gain material 130 can provide the non-linear change in the refractive index. The remaining elements of the oscillator 100 can be analogous to the previously described output coupler mirror 120, the gain material 130, and the folding mirrors 140-1/140-2.

Figure 3B:
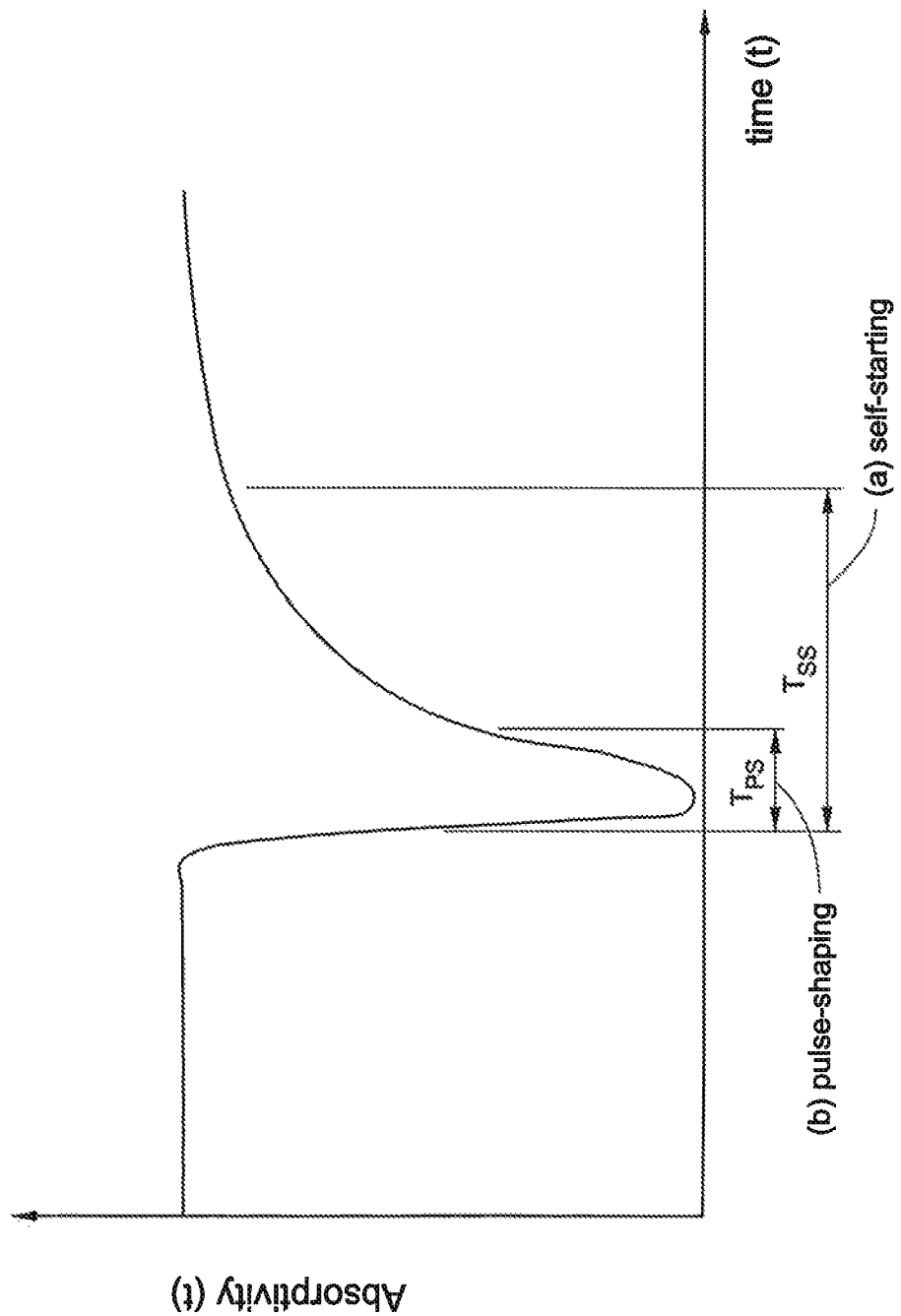
FIG. 3B illustrates the time dependence of the absorptivity of the laser oscillator of FIG. 3A.

FIG. 3B illustrates that in these designs, the time dependence of the absorptivity can be complex. As the light intensity exceeds a threshold because of a fluctuation, the slow nonlinear element 112 can be able to self-start the oscillator 100 by its absorption dipping, as long as its recovery time $T_{SS}$ is sufficiently slow. The fast nonlinear element 114 can superimpose on this slow recovery curve a faster recovery process with its faster recovery time $T_{PS}$ to Shape the pulses into ultra-short pulses.

However, such designs can have at least the following drawbacks. (a) Using two nonlinear elements is costly. (b) Implementing two elements occupies extra space that is at a high premium in a cramped oscillator cavity, (c) Having two separate elements complicates the process of manufacture. (d) The two elements may require separate tuning and calibration. And finally, (e) they introduce twice as many unintended consequences, in need of further compensation. Problem (e) arises primarily because the slow nonlinear element 112 and the fast nonlinear element 114 typically use different modes of operations, such as a Kerr-effect that modulates the phase and a SESAM that modulates the amplitude. These different modes of operation can lead to different types of unintended consequences. For example, as described above, the Kerr-effect introduces an undesirable complex coupling between temporal and spatial effects, modulating the pulse as it propagates through the nonlinear element. This modulation needs to be compensated, e.g., by inserting additional dynamical lenses in the cavity, further increasing the complexity of the design.

Figure 4A:
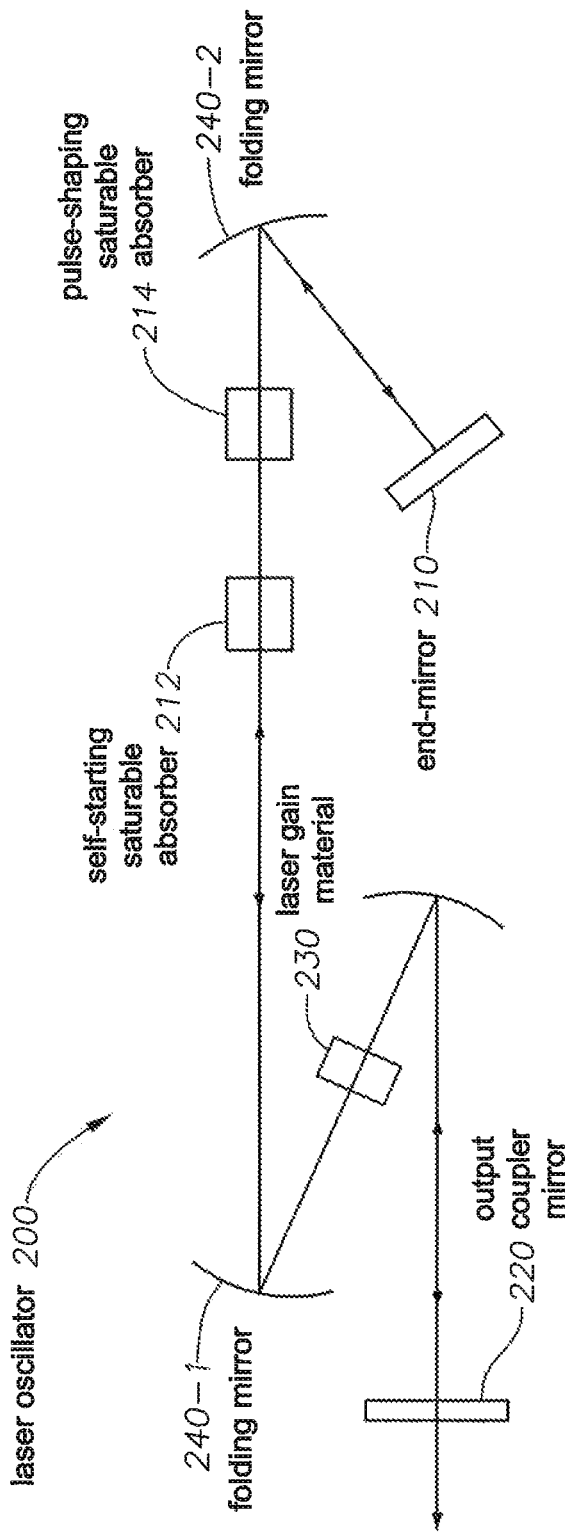
FIGS. 4A-B illustrate examples of a laser oscillator 200 with two saturable absorbers 212 and 214.

FIG. 4A illustrates embodiments that provide a simple solution to the above contradictory design challenges. One of the embodiments is a laser oscillator 200 to amplify a pulsed light beam that can include the analogs of previously introduced elements: an end-mirror 210 to return the pulsed light beam into the laser oscillator 200, an output coupler mirror 220 to reflect a reflected portion of the pulsed light beam back into the laser oscillator, and to couple an outputted portion of the pulsed light beam out from the laser oscillator 200, and a laser gain material 230, positioned between the end-mirror 210 and the output coupler mirror 220 along an optical path to amplify the light beam. Oscillators 200 that are intended to operate in a tight spatial environment can also include one or several folding mirrors, such as 240-1 and 240-2.

In addition, the oscillator 200 can again include two nonlinear elements, 212 and 214, one optimized for the mode-locked self-starting requirement, the other for the ultra-short pulse-shaping requirement. In contrast to the oscillator 100, however, in embodiments of the oscillator 200 the nonlinear elements 212 and 214 can have the same operating principle, such as both of them can be saturable absorbers.

In some oscillators 200, the self-starting saturable absorber 212 and the pulse-shaping saturable absorber 214 can be separate optical elements. In some oscillators 200 the self-starting saturable absorber 212 and the pulse-shaping saturable absorber 214 can be separate layers integrated within the single end-mirror 210. In either of these cases, the material parameters and positions of the absorbers 212 and 214 can be selected to optimize their functionalities.

The optimization can involve suitably choosing the recovery times and the threshold fluences of the self-starting saturable absorber 212 and the pulse-shaping saturable absorber 214. The self-starting saturable absorber 212 can have a self-starting recovery time $T_{SS}$ in the range of 10 fs-100 ns, 100 fs-10 ns or 500 fs-10 ns. The pulse-shaping saturable absorber 214 can have a pulse-shaping recovery time $T_{PS}$ in the range of 1 fs-1 ps, 10 fs-1 ps, or 50 fs-500 fs. Accordingly, in some cases, the pulse-shaping recovery time $T_{PS}$ can be 1-1,000 times shorter than the self-starting recovery time $T_{SS}$. In other embodiments, $T_{PS}$ can be 10-100 times shorter than the self-starting recovery time $T_{SS}$. Suitable ranges on the threshold fluences are described later.

Each of the self-starting saturable absorber 212 and the pulse-shaping saturable absorber 214 can operate in a transmissive or a reflective mode.

The oscillator 200 having a pair of nonlinear elements 212 and 214 with the same operating principle can meet the earlier-listed design challenges in the following ways. (a) Using one pair of same-principle nonlinear elements is cheaper, as they can be formed in an integrated manner as separate layers in the same semiconductor crystal. (b) Analogously, the two same-principle nonlinear elements can occupy less space, especially in the integrated embodiments. (c) Being based on the same operating principle, the joint manufacture of the nonlinear elements 212 and 214 is also simpler. (d) The calibration of the two same-principle nonlinear elements 212 and 214 is also easier. And, finally (e) since the two same-principle nonlinear elements 212 and 214 operate based on the same principle, there is no need for two, separate compensatory mechanisms for their unintended consequences and effects.

To highlight the last point (e), in a laser oscillator 100 where the nonlinear element 110 or at least one of the nonlinear elements 112/114 operates on the basis of the Kerr effect, the refractive index of a material is modulated as a function of light intensity via a complex coupling of temporal and spatial effects. The refractive index is modulated in time as a pulse propagates through the nonlinear material. One of the consequences of this modulation is that the spatial profile of the pulse perpendicular to the propagation direction gets spatially distorted, since the highest intensity central part of the pulse suffers a higher phase modulation than its "wings", thus distorting the beam. This effect is sometimes referred to as self-focusing. Laser cavities of this type need a very careful design and precise implementation. They often have an intracavity spatial filter, such as an aperture, so the overall cavity prefers the desired short-pulse modes and suppress the non-mode-locked or long pulse modes. As noted before, the need for such compensating elements increases the complexity of the design, requires the fine tuning of the laser cavity, and makes achieving the stability and a good spatial mode-profile for the laser beam more challenging. Also, Kerr-cells have typically much higher threshold fluences and it is difficult to operate them with relatively longer, picosecond pulses.

Motivated by these complications, some embodiments of the oscillator 200 utilize saturable absorption as the shared operating principle of the non-linear elements 212 and 214. These oscillators 200 can employ saturable absorbers 212 and 214 instead of Kerr cells, as saturable absorbers do not modulate the phase of the light considerably; they act mainly on the light amplitude. Using saturable absorption as the shared principle eliminates the need for implementing controlling mechanisms for the transversal modes into the oscillator 200.

One efficient way to implement the same operating principle is to form the saturable absorbers 212 and 214 from the same material, such as from the same semiconductor.

Some embodiments of the oscillator may use saturable gain instead of saturable absorption as the shared operating principle, and may utilize two gain elements.

Even in the same-principle embodiments the above design challenges need to be addressed. If the saturable absorbers 212 and 214 are formed in the same semiconductor, the self-starting saturable absorber 212 needs the threshold fluence of the semiconductor to be low so that it can start the oscillator 200 by amplifying the small random fluctuations of the beam, whereas the pulse-shaping saturable absorber 214 needs the threshold fluence to be high so that it can select and amplify only the peak of the pulses, thus making them the shortest possible.

Figure 4B:
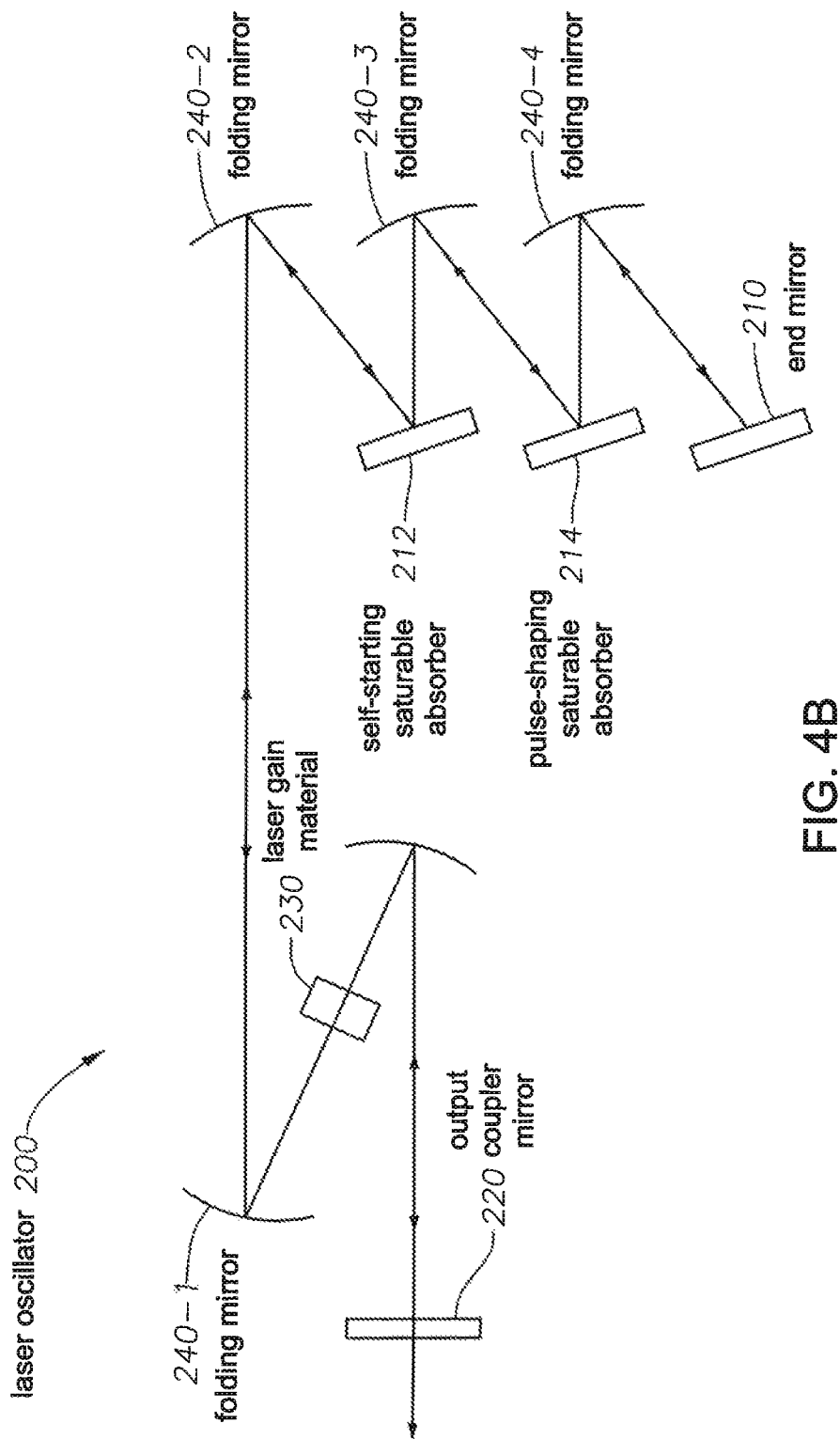

FIG. 4A illustrates a transmissive embodiment of the self-starting saturable absorber 212 and the pulse-shaping saturable absorber 214. FIG. 4B illustrates a reflective embodiment of the self-starting saturable absorber 212 and the pulse-shaping saturable absorber 214. Some of these oscillators 200 can make use of additional folding mirrors 240-3 and 240-4.

Figure 5A:
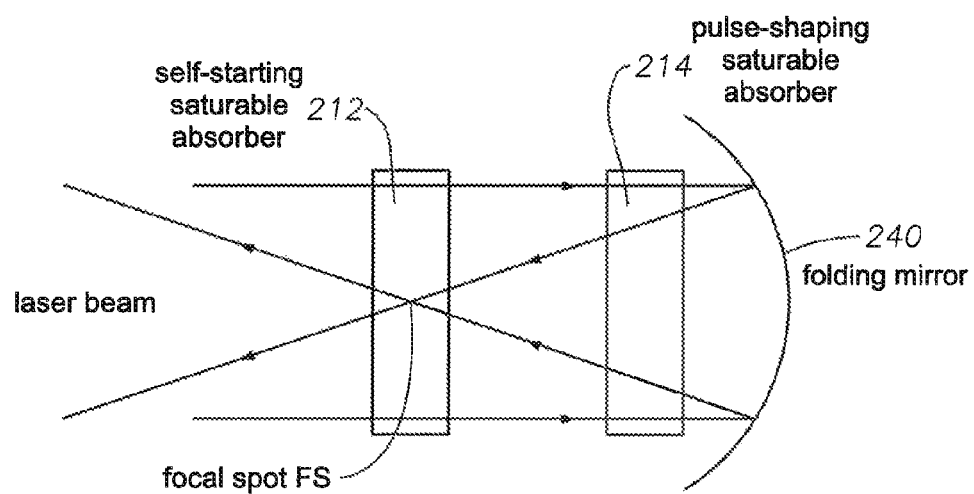
FIGS. 5A-D illustrate implementations of the two-absorber laser oscillator 200.
Figure 5B:
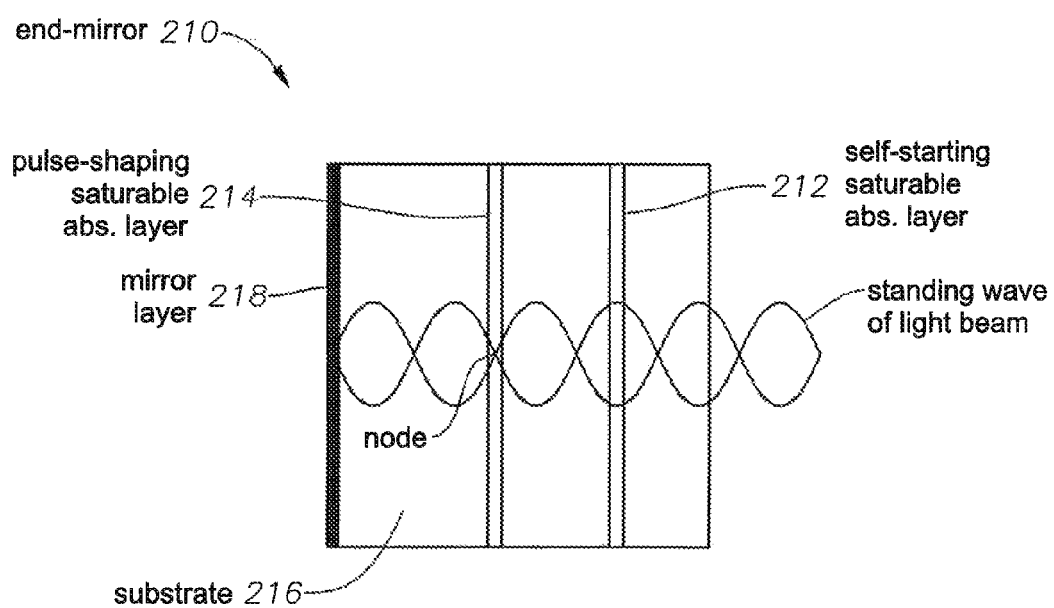
Figure 5C:
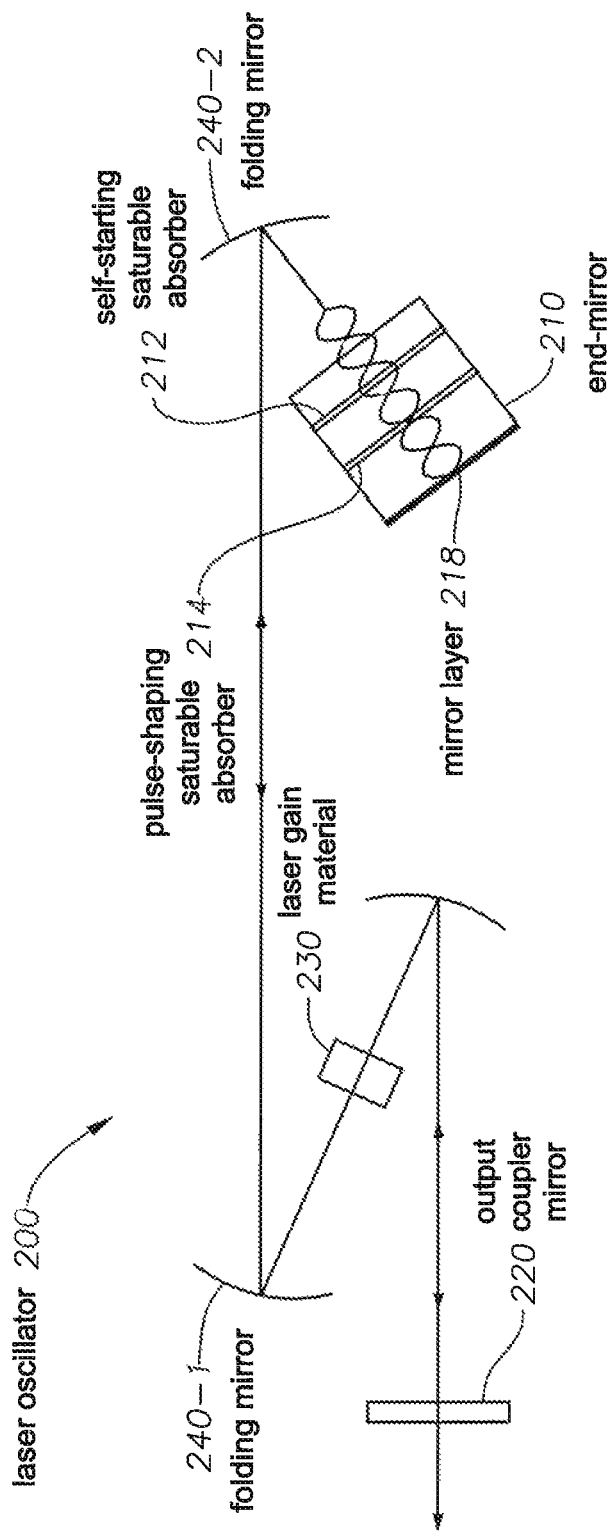
Figure 5D:
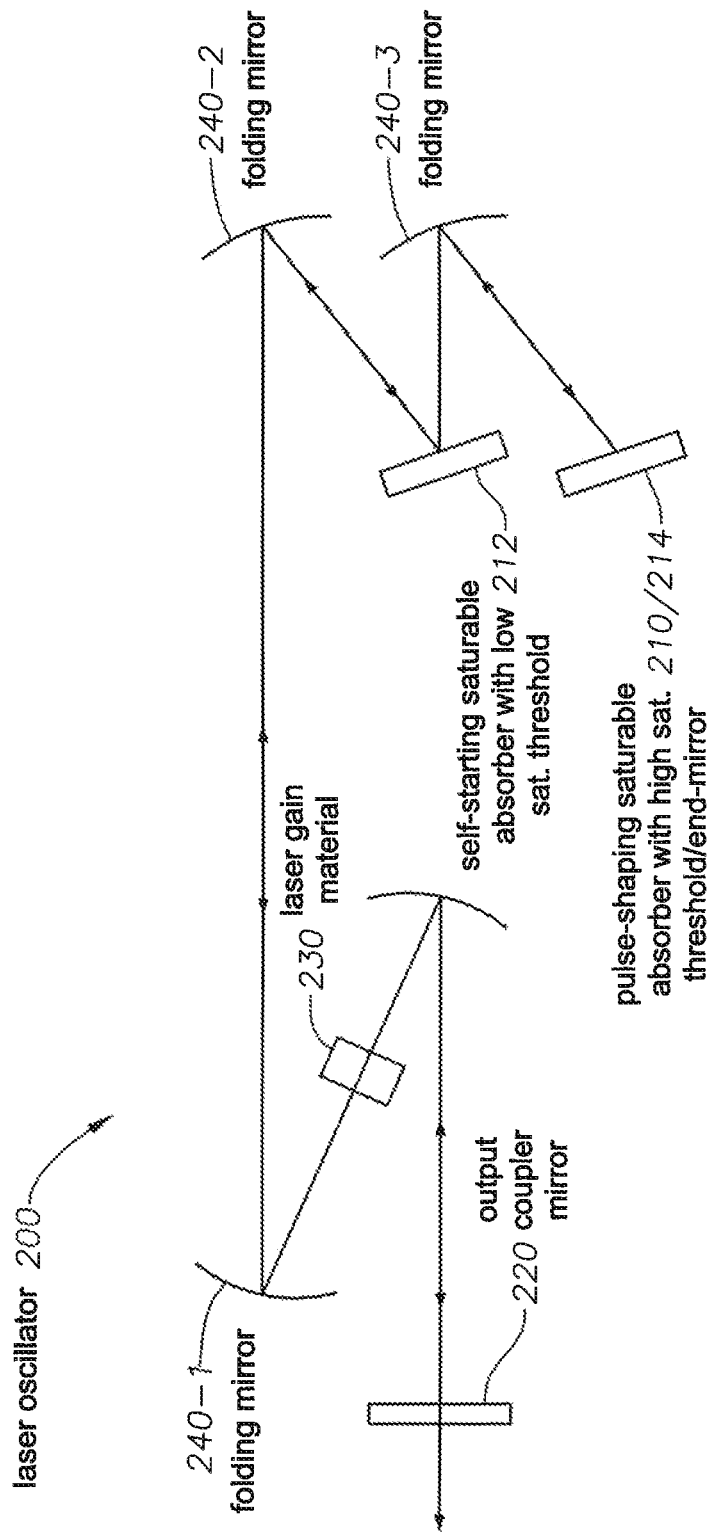

FIGS. 5A-C illustrate that some embodiments of the oscillator 200 address these contradictory design requirements by exposing the two saturable absorbers to different beam intensities, while FIG. 5D illustrates that other embodiments modify the threshold fluences of the two saturable absorbers, as described below.

The oscillator 200 of FIG. 5A can focus the laser beam to a focal spot FS, for example by using a focusing folding mirror 240, possibly in combination with a beam expander. For clarity, only the relevant section of the oscillator 200 is shown explicitly. Positioning the saturable absorbers 212 and 214 differently relative to the focal spot FS is an efficient way to control the beam intensity experienced by the absorbers individually, as the focusing compresses the beam radius around the focal spot FS and thus increases the beam intensity (beam energy per unit area) there. Such a beam expansion and refocusing can be achieved by including a wide variety of alternative refractive or reflective elements as well.

In these embodiments of the oscillator 200, the self-starting saturable absorber 212 can be placed close to the focal spot FS where the beam gets compressed to its smallest radius. Therefore, when after energizing the oscillator 200 the light starts fluctuating, the intensity or fluence of the fluctuating beam exceeds the threshold first at the focal spot FS, close to where the self-starting saturable absorber 212 is located. In response, the self-starting saturable absorber 212 gets activated and the fluctuation gets amplified during its roundtrips. Since the self-starting saturable absorber 212 has a sufficiently slow recovery time $T_{SS}$, the amplified fluctuation can self-start the oscillator 200.

At the same time, since the pulse-shaping saturable absorber 214 is positioned farther from the focal spot FS than the self-starting saturable absorber 212, at its location the same beam is distributed over a larger beam radius and thus the beam intensity experienced by the pulse-shaping saturable absorber 214 is lower than the intensity experienced by the self-starting saturable absorber 212. For this reason, the same fluctuation that activated the self-starting saturable absorber 212 does not activate the pulse-shaping saturable absorber 214 if they are formed from the same semiconductor and thus have the same threshold fluence or intensity. Once the self-starting saturable absorber 212 started the oscillator 200 and the mode-locked pulse starts to get more and more amplified after a few roundtrips, eventually the pulse intensity exceeds the fluence threshold at the location of the pulse-shaping saturable absorber 214 as well, activating or opening it. Once the pulse-shaping saturable absorber 214 is also activated, it starts narrowing down the pulse, shaping it into an ultra-short pulse.

Expressing the design of FIG. 5A in another way, the oscillator 200 can spatially vary a beam radius R of the pulsed light beam along an optical pathway in the oscillator. The self-starting saturable absorber 212 can be disposed at a first location in the oscillator 200 where the beam radius is R1, and the pulse-shaping saturable absorber 214 can be disposed at a second location in the oscillator 200 where the beam radius is R2, wherein R1 is smaller than R2.

FIG. 5B illustrates another, integrated embodiment of the oscillator 200 where the self-starting saturable absorber 212 and the pulse-shaping saturable absorber 214 are formed not only from the same type of semiconductor, but in fact within the same semiconductor crystal: on a substrate 216 of the end-mirror 210. In the shown reflective saturable absorber design, a mirror layer 218 of the end-mirror 210 can form a standing wave from the incident light beam and the reflected light beam. Analogously to the design principle of the embodiment of FIG. 5A, the self-starting saturable absorber 212 can be formed as a layer where the beam intensity is high, such as away from the nodes of the standing wave, whereas the pulse-shaping saturable absorber 214 can be formed where the beam intensity is lower, such as closer to a node of the standing wave. As before, with this design as an accidental fluctuation forms, the light intensity grows above the fluence threshold first in the self-starting saturable absorber 212, activating it to self-start the oscillator 200. As the pulses get amplified during their roundtrips, the beam intensity reaches the threshold even around the node regions of the standing wave where the pulse-shaping saturable absorber 214 is located, thus activating the pulse-shaping saturable absorber 214. Once activated, the pulse-shaping saturable absorber 214 then can shape the pulses into ultra-short pulses.

In these architectures, the saturable absorber layers can be formed and positioned efficiently utilizing quantum well designs, since the thickness of the quantum wells can be controlled with a precision much smaller than the wavelength of the light and also the growing conditions of the layers can be very welt controlled.

In these integrated embodiments, where the two saturable absorber layers are formed in the same semiconductor, since the layers are grown sequentially, different growing conditions can be applied to the self-starting and pulse-shaping saturable absorber layers. These designs can achieve different saturation fluences and recovery times for the saturable absorber layers 212 and 214.

FIG. 5C illustrates an oscillator 200 with the integrated end-mirror 210 of FIG. 5B, wherein the self-starting saturable absorber layer 212 is positioned away from nodes of the standing wave of light and thus close to a maximum of the standing wave of the light, whereas the pulse-shaping saturable absorber layer 214 is positioned close to a node of the standing wave of light.

Next, various embodiments of the free-space laser oscillator 200 will be described. The laser oscillator 200 can be used as a seed laser for a chirped pulse amplification (CPA) laser, where the amplified pulses are used for ophthalmic surgery. For such ophthalmic surgical lasers a wavelength in the near infrared can be useful where Nd or Yb doped crystals or glasses work well. The laser wavelength can be in the range of 1030 nm-1070 nm. When the oscillator pulses are subsequently amplified in an amplifier, the power from the oscillator is less critical. Thus, a relatively low 10 to 250 mW average power can be sufficient, with pulse duration between 1 fs and 1,000 fs, or 150 fs and 500 fs and repetition rate between 1 MHz and 1,000 MHz, or 40 and 150 MHz. These power levels, pulse durations and repetition rates are achievable with Nd and Yb gain materials in a compact optical setup. For example, in a laser with 100 mW average power, 300 fs pulse duration, 100 MHz repetition rate, 5% output coupler and non-saturable losses, the intra-cavity average power can be 2 W, or 20 nJ energy per pulse with approximately 6 kW peak power.

With a cavity length of 1.5 m, a flat output coupler and focusing minors around the crystal and the SESAM with a 0.1 in radius of curvature, the mode area can be about 800 square micrometers inside the crystal and at the SESAM, resulting in an optical fluence of about 2,400 $\mu J/cm^2$. In order to prevent Q-switching, the pulse-shaping saturable absorber 214 can operate at optical, or operating, fluences 3-10 times, 2-30 times or 1-100 times the saturation fluence of the pulse-shaping saturable absorber 214. This notion can set a design value for the saturation fluence of the pulse-shaping saturable absorber 214 in the 20-2,000 $\mu J/cm^2$, 80-1,200 $\mu J/cm^2$, or 200-800 $\mu J/cm^2$ range.

Since the oscillator 200 can be capable of producing pulses that are up to ten times shorter than the recovery time of the absorber, especially in the soliton mode-locked regime, the recovery time of the pulse-shaping saturable absorber can be about 1-10 picoseconds, in some cases, about 3 ps.

In order to start the mode-locked operations reliably, the self-starting saturable absorber 212 can be able to "pre-organize" the modes of the laser to generate quasi-random pulse spikes, which can activate the pulse-shaping absorber 214. This will happen if the energy content of the pulse spikes within a time window of the recovery time of the pulse-shaping absorber 214 is a noticeable fraction of the saturation energy of the pulse-shaping absorber 214. To reach e.g. ¹⁄₁₀ of the saturation energy of the pulse-shaping absorber 214 at 5 times the saturation energy of the self-starting absorber 212, the saturation fluence of the self-starting absorber 212 can be 5*10=50 times lower than that of the pulse-shaping absorber 214. With the above numerical ranges for the pulse-shaping absorber 214, this factor of about 50 ratio can translate to a range of saturation fluences of about 0.5-40 $\mu J/cm^2$, 2-25 $\mu J/cm^2$, or 4-15 $\mu J/cm^2$ range for the self-starting absorber 212. In various embodiments, the ratio of a saturation fluence of the pulse-shaping saturable absorber 214 to a saturation fluence of the self-starting saturable absorber 212 can be in a range of 1-100, 2-30, and 3-10, defining further saturation fluence ranges for the self-starting saturable absorber 212.

The recovery time of the self-starting absorber 212 can also be longer, such as an order of magnitude longer than desired starting pulse spikes, or the recovery time of the pulse-shaping absorber 214, in the 10-100 ps range, such as 30 ps.

It is noted that a longer recovery time can reduce the saturation fluence of the absorber, the excitations within the absorber can stay in their upper energy level longer, can store more energy in the upper state and the relaxed excitations do not need to be pumped up again to their upper level. This is useful for the design of the low-saturation-fluence, long-recovery-time self-starting absorber 212. Also note that after the turn-on transients, the self-starting absorber 212 can operate in the fully opened state, at fluences 10-100 times above saturation, such as about 50 times above saturation. This deep saturation also helps preventing Q-switching instabilities.

The factor of 10-100 difference between the saturation fluences of the two absorbers can be split into two parts. Taking a ratio of 50 as an example, a factor of 10 can come from differences in the material and spectroscopic properties of the self-starting absorber 212 and the pulse-shaping absorber 214. The remaining factor of 5 can come from the different locations of the absorbers 212 and 214 relative to the nodes of the standing wave pattern in the integrated layered SESAM end-mirror 210.

FIG. 5D illustrates that in yet other embodiments of the oscillator 200, instead of positioning the saturable absorbers 212 and 214 to locations with differing beam intensities, they can be formed with differing fluence thresholds or saturation thresholds. In such embodiments, even if the absorbers experience similar or even identical beam intensities, they can get activated at different beam intensities or fluences because of their different thresholds. Analogously to the other embodiments, in some oscillators 200 the self-starting saturable absorber 212 can be formed with a saturation threshold lower than the saturation threshold of the pulse-shaping saturable absorber 214. In such an oscillator 200 the fluctuations first activate the self-starting saturable absorber 212 which starts the amplification of the pulses with a relaxation time $T_{SS}$. As the pulse amplitude gets amplified during its multiple roundtrips, it reaches the saturation threshold of the pulse-shaping saturable absorber 214, activating it. The activated pulse-shaping saturable absorber 214 then shapes the pulse into an ultra-short pulse. In the embodiment of FIG. 5D, the pulse-shaping saturable absorber can also act as an end-mirror 210.

In one embodiment of the oscillator 200, the difference of the threshold or saturation fluences can be achieved by forming saturable absorbers 212 and 214 from different materials. The materials can be chosen from SESAM's, bulk semiconductor absorbers, atomic absorbers in glasses or crystal, semiconductor quantum wells, quantum dots, doping layer structures, thin films of organic dyes, organic semiconductors, or layers of carbon nanotubes, among others.

In another embodiment, the saturable absorber layers 212 and 214 can be formed from similar materials but with their spectroscopic properties changed or modified. For example the absorption spectrum of the underlying semiconductor crystal can be modified so that the peak of the absorption is changed by modifying the layer thicknesses in the quantum wells of the absorbers.

Here it is recalled that quantum wells are two dimensional nanostructures whose geometrical extent can be comparable to the wavelength of the quantum excitations of the host matter: its electrons, holes, excitons, and polarons, among others. The spectroscopy of quantum wells can be altered by modifying their structure, material composition, defect or dopant concentration, ion implantation, and the stress in the layers induced by differing growth conditions. The spectroscopic properties of the quantum well structures can be also tuned and modified by employing different growth geometries, applying different growth conditions, defect levels, dopant levels, and ion implantation conditions to achieve the desired saturation fluences and absorption recovery or relaxation times.

Embodiments of the saturable absorbers that use dyes or organic semiconductors can custom tune the spectroscopic properties by slightly changing their chemical composition. In yet other absorber embodiments the host materials, such as glasses or crystals can modify the spectroscopy of the imbedded atoms. The recovery times $T_{SS}$ and $T_{PS}$ and the saturation or threshold fluences can also be custom tailored by manipulating the inter-molecular interactions in dyes and organic semiconductors.

While the principles of operation were demonstrated here on free space implementations, the same principles can be implemented in fiber oscillators as well. For example, the laser oscillator 200 can be a diode pumped fiber oscillator 200. The oscillator may include a single pumping diode or a large variety of other diodes and diode structures, such as a bank or a cluster of diodes. Fiber oscillators can be much smaller than free space oscillators and may require less fine tuning and calibration. In surgical applications, where the crowdedness of the operating theatre is a pressing constraint, reducing the spatial extent of the laser oscillator 200 can be a highly prized design feature.

In some examples, the oscillator 200 can include further structures to improve the dynamic behavior and the pulse quality, including dispersion control element, such as fiber Bragg gratings, and frequency stabilized pump diodes, containing a frequency stabilizing bar, such as a volume Bragg grating inside the diode. Such lasers can provide pulses with low noise and high pulse-to-pulse stability. The fiber may be formed of glass doped by Nd or Yb.

Overall, the laser oscillator 200 can output essentially transform-limited seed pulses, e.g. with a Gaussian shape. In some examples, flat-top pulses may be also generated. The pulse-duration can be less than 1,000 fs. In some implementations, the pulse duration can be in the 10-1,000 fs range, in some other embodiments in the 100-500 fs range. The pulse frequency, or repetition rate can be in the range of 1-1,000 MHz, in other embodiments in the range of 10-100 MHz. The power of the beam of pulses can be in the range of 10-1,000 mW, in other embodiments in the range of 100-200 mW.

It is finally mentioned that one of the widely used application of the here described laser oscillators 200 is to serve as a source of seed pulses in Q-switched Chirped Pulse Amplification (CPA) lasers.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination, in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

The invention claimed is:

1. A laser oscillator to generate a pulsed light beam, comprising:
   an output coupler mirror, configured
      to reflect a reflected portion of the pulsed light beam back into the laser oscillator, and
      to couple an outputted portion of the pulsed light beam out from the laser oscillator;
   an end-mirror, configured to return the pulsed light beam into the laser oscillator;
   a gain material, positioned between the output coupler mirror and the end-mirror along an optical path, configured to amplify the pulsed light beam;

a self-starting saturable absorber, configured to self-start a pulsed mode-locking operation of the laser oscillator; and a pulse-shaping saturable absorber, configured to shape pulses of the pulsed light beam into laser pulses with a pulse length of less than 1,000 femtosecond.

2. The laser oscillator of claim 1, wherein:
the self-starting saturable absorber and the pulse-shaping saturable absorber are separate optical elements.

3. The laser oscillator of claim 1, wherein:
the self-starting saturable absorber and the pulse-shaping saturable absorber are separate layers integrated on the same substrate.

4. The laser oscillator of claim 1, wherein:
the self-starting saturable absorber and the pulse-shaping saturable absorber are separate layers integrated with the end-mirror.

5. The laser oscillator of claim 1, wherein:
the self-starting saturable absorber has a self-starting recovery time $T_{SS}$ in the range of one of 10 fs-100 ns, 100 fs-10 ns, and 500 fs-10 ns.

6. The laser oscillator of claim 1, wherein:
the pulse-shaping saturable absorber has a pulse-shaping recovery time $T_{PS}$ in the range of one of 1 fs-1 ps, 10 fs-1 ps, and 50 fs-500 fs.

7. The laser oscillator of claim 1, wherein:
a ratio of a self-starting recovery time $T_{SS}$ of the self-starting saturable absorber to a pulse-shaping recovery time $T_{PS}$ of the pulse-shaping saturable absorber is within one of the ranges of 1-1,000 and 10-100.

8. The laser oscillator of claim 1, wherein:
at least one of the self-starting saturable absorber and the pulse-shaping saturable absorber comprises at least one of a semiconductor saturable absorption mirror (SESAM), a set of doping layers, a semiconductor quantum well structure, an atomic absorber in a glass, a quantum dot, a thin film or an organic dye, an organic semiconductor, and a carbon nanotube layer.

9. The laser oscillator of claim 1, wherein:
the self-starting saturable absorber is configured to operate in one of a transmissive mode and a reflective mode; and
the pulse-shaping saturable absorber is configured to operate in one of a transmissive mode and a reflective mode.

10. The laser oscillator of claim 1, wherein:
the laser oscillator is configured to vary a laser power density spatially; and
the self-starting saturable absorber is disposed at a location where the power density is higher than the power density at a location where the puke-shaping saturable absorber is disposed.

11. The laser oscillator of claim 1, wherein:
the laser oscillator is configured to spatially vary a beam radius R of the pulsed light beam within the laser oscillator;

the self-starting saturable absorber is disposed at a first location in the laser oscillator where the beam radius is R=R1; and
the pulse-shaping saturable absorber is disposed at a second location in the laser oscillator where the beam radius is R=R2; wherein
R1 is smaller than R2.

12. The laser oscillator of claim 1, wherein:
the self-starting saturable absorber and the pulse-shaping saturable absorber are formed within the end-mirror;
the end-minor is configured to form a standing wave from an incident light and a reflected light, the standing wave having at least one node; and
the pulse-shaping saturable absorber is formed closer to the node than the self-starting saturable absorber.

13. The laser oscillator of claim 1, wherein:
a ratio of a saturation fluence of the pulse-shaping saturable absorber to a saturation fluence of the self-starting saturable absorber is in a range of one of 1-100, 2-30, and 3-10.

14. The laser oscillator of claim 1, wherein:
a ratio an optical fluence of the pulse-shaping saturable absorber to a saturation fluence of the pulse-shaping saturable absorber is in a range of one of 1-100, 2-30, and 3-10.

15. A laser oscillator to generate a pulsed light beam, comprising:
an output coupler or, configured
to reflect a portion of the pulsed light beam back into the laser oscillator, and
to couple a portion of the pulsed light beam out from the laser oscillator;

a semiconductor saturable absorption mirror structure, comprising
an end-mirror layer, configured to return, the pulsed light beam into the laser oscillator,
a self-starting saturable absorption layer, configured to self-start a pulsed mode-locking operation of the laser oscillator, and
a pulse-shaping saturable absorption layer, configured to shape pulses of the pulsed light beam into laser pulses with a pulse length of less than 1,000 femtosecond; and a gain material, positioned between the output coupler mirror and the semiconductor saturable absorption mirror along an optical path, configured to amplify the pulsed light beam.

16. The laser oscillator of claim 15, wherein:
the self-starting saturable absorption layer is formed within the semiconductor saturable absorption mirror structure at a location where an intensity of the pulsed light beam is greater than at a location of the pulse-shaping saturable absorption layer.

\* \* \* \* \*

UNITED STATES PATENT AND TRADEMARK OFFICE
CERTIFICATE OF CORRECTION

PATENT NO.        : 8,724,666 B1  
APPLICATION NO.   : 13/733966  
DATED             : May 13, 2014  
INVENTOR(S)       : Ferenc Raksi Page 1 of 1

It is certified that error appears in the above-identified patent and that said Letters Patent is hereby corrected as shown below:

On the title page item (71) Delete "Fort Worth, TX (US)" and insert --Aliso Viejo, CA (US)--

Signed and Sealed this  
Seventh Day of October, 2014

Michelle K. Lee  
*Deputy Director of the United States Patent and Trademark Office*